Jan. 5, 1971     T. M. TRUMBLE     3,553,665
PORTABLE HYDROGEN FLAME DETECTOR
Filed March 3, 1967
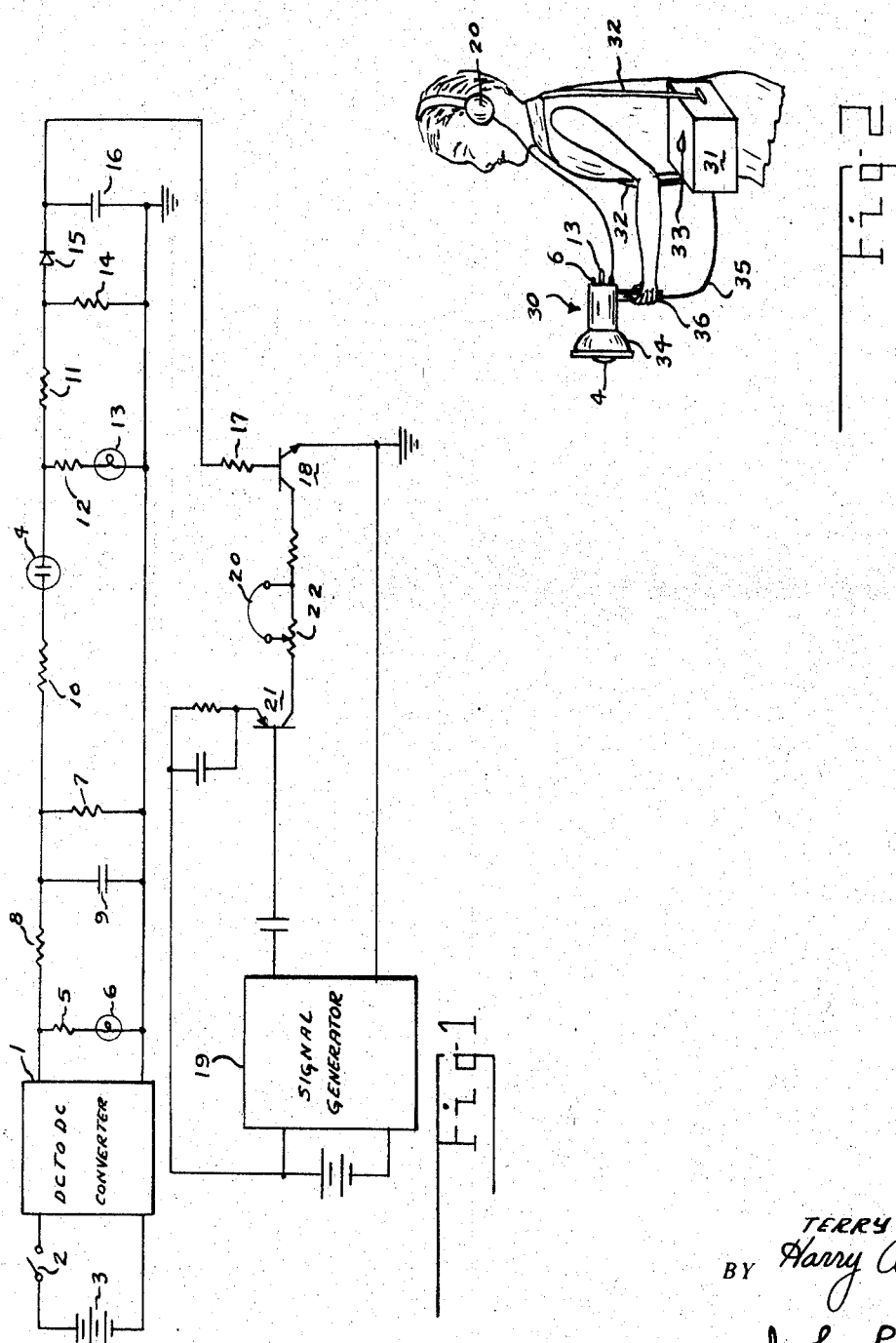
INVENTOR.
TERRY M. TRUMBLE
BY Harry A. Herbert Jr
ATTORNEY
John P. O'Brien
AGENT United States Patent Office 3,553,665
Patented Jan. 5, 1971

3,553,665
PORTABLE HYDROGEN FLAME DETECTOR
Terry M. Trumble, Dayton, Ohio, assignor to the United States of America as represented by the Secretary of the Air Force
Filed Mar. 3, 1967, Ser. No. 621,398
Int. Cl. G08b 17/12
U.S. Cl. 340—228   1 Claim

ABSTRACT OF THE DISCLOSURE

A portable hydrogen flame detector for use in a hydrogen storage area to detect small hydrogen flames. The detector utilizes an ultraviolet tube which becomes ionized in the presence of ultraviolet radiation emitted from a hydrogen flame. A charging circuit operates in conjunction with the tube to provide a series of pulses during each period that the ultraviolet tube is ionized. These pulses are fed into a visual readout circuit that cause a neon indicator to blink on and off, and into an audio readout circuit that cause a series of tone busts in a set of head phones.

The invention described herein may be manufactured and used by or for the United States Government for governmental purposes without the payment to me of my royalty thereon.

BACKGROUND OF THE INVENTION

The storage of large amounts of hydrogen creates potential fire and explosion hazards. In these storage areas a rapid and reliable means for detecting a hydrogen flame is essential in minimizing these hazards. Because small hydrogen flames cannot be readily detected at great distances, it is important that a hydrogen detector be easily carried and moved. This invention relates to such a portable hydrogen fire detector.

Hydrogen flames are, for all practical purposes, invisible to the unaided eye. The problem of discretely detecting hydrogen flames without interference from spurious radiation from other sources requires the detection of some unique characteristic of hydrogen flames. Hydrogen flames emit both ultraviolet and infrared radiation. The technique of measuring the amount of either ultraviolet or infrared radiation present in a given area can be used to detect the presence of a hydrogen flame.

In the hydrogen-oxygen burning process, the infrared band has more energy associated with it than does the ultraviolet emission, which suggest that it would be easier to detect a hydrogen flame by measuring its infrared radiation rather than its ultraviolet radiation. Accurate detection of infrared emission from a hydrogen flame is greatly limited because its emission band (1.0 to 3.6 microns) at sea level lies in the solar blackbody radiation band (0.3 to 5.5 microns). If solar blackbody radiation and a hydrogen fire exists at the same time, discrimination between the two sources of infrared radiation would be impossible. Also the infrared emission band lies in the atmospheric water absorption band, which greatly attenuates the transmission of infrared emission in a high water vapor atmosphere.

On the other hand, ultraviolet bands from 2000 A. through 2950 A. at sea level are free from solar radiation, i.e. lie in the solar-blind ultraviolet region. Hydrogen fires emit ultraviolet bands between 2000 A. and 2950 A. Thus, detection of ultraviolet emission from a hydrogen flame would be free of background noise problems. Further, atmospheric attenuation of ultraviolet emission is the least in the solar-blind ultraviolet region. For these reasons, this invention detects a hydrogen flame by determining the presence of ultravolet radiation.

SUMMARY OF THE INVENTION

The primary goal in the design of this invention was to build a portable device which would detect a small hydrogen flame from a modest distance. Because the size, shape and weight of such a portable device must be conducive to easy, non-tiring handling by the user, it limited the choice of components to be used.

The selection of a suitable power supply for this invention was based not only on its size and weight but on its output voltage. It was determined most ultraviolet tubes require a sensitizing voltage of 1,000 volts D.C. A D.C. voltage of 1,500 volts was chosen as a goal so that the voltage would be more than required and could be reduced as necessary. To supply this 1,500 volts D.C. from low voltage batteries a D.C. to D.C. converter was selected.

The power supply is encased in a box-shape housing withan ON-OFF switch. The housing is fitted with a shoulder strap for easy carrying over the user's shoulder.

The remainder of the hydrogen detector is housed in a hand gun, except for a set of head phones. The hand gun is light in weight to permit the user to scan the area by movement of his arm in a sweeping fashion.

When the hand gun is pointed at a flame front a detector light, located on the back of the hand gun, will blink on and off. At the same time the head phones, which plug in the back of the hand gun, will emit a series of tone bursts. When the sound in the head phones reaches the highest interruption frequency approaching a constant buzz or hum, the energy entering the detector is a maximum. By scanning sideways and up and down, the flame front can thus be determined.

The object of this invention is to provide a portable hydrogen flame detector which is small in size and light in weight.

BRIEF DESCRIPTION OF THE DRAWINGS

FIG. 1 is a schematic diagram of one embodiment of the present invention.

FIG. 2 illustrates an arrangement for housing the elements of FIG. 1.

DESCRIPTION OF THE PREFERRED EMBODIMENT

Referring to FIG. 1, there is shown a schematic diagram of the hydrogen flame detector of this invention.

The power supply consist of D.C. to D.C. converter 1, ON-OFF switch 2 and battery 3. D.C. to D.C. converter 1 represents any of the commercially available converters which are capable of providing a large output voltage (about 1,000 volts D.C.) to sensitize ultraviolet tube 4. Across the output terminals of converter 1 is neon lamp 6 in series with resistor 5. Neon lamp 6 is illuminated when D.C. to D.C. converter 1 is operating. Resistor 5 serves to limit the current through lamp 6. Lamp 6 is located on the back of hand gun 30, as shown in FIG. 2. When indicator lamp 6 is illuminated, the user of hand gun 30 knows the sensitizing voltage for ultraviolet tube 4 is present.

The magnitude of the output voltage from converter 1 which appears across ultraviolet tube 4 is scaled down by a voltage divider network, formed by resistors 7 and 8. The voltage drop across resistor 7 determines the sensitizing voltage for tube 4. Resistor 8 also determines the charging rate of capacitor 9.

In the presence of a sufficient level of ultraviolet radiation, tube 4 turns on and the following cycle occurs. Tube 4 tries to go from the maximum sensitizing voltage (about 825 volts) down to a much lower voltage (about 325 volts) where it regulates. Capacitor 9 at this time discharges through resistor 10 across tube 4 and through the series parallel-connected resistor 12 and indicator 13, and series connected resistors 11 and 14. Resistor 10 serves to control the discharge time of capacitor 9. The ionization of tube 4 ceases when the voltage across capacitor 9 drops to a certain low value (about 350 volts). When this happens, tube 4 stops conducting and capacitor 9 starts to re-charge through resistor 8. The cycle is repeated until the ultraviolet radiation level reduces below the value to ionize tube 4.

Each time tube 4 turns on, it continues to conduct for a short but consistent time period (about 2.5 milliseconds is preferred to optimise background noise rejection). Neon indicator light 13 is illuminated during each conduction period. Indicator light 13 is physically located on the back of hand gun 30 (see FIG. 2) and serves as a visual indicator of the presence of a hydrogen flame.

The input voltage to the audio readout circuit appears across resistor 14. Diode 15 feeds each input pulse into capacitor 16 and prevents capacitor 16 from discharging back into the input circuit. Each pulse discharging from capacitor 16 flows through resistor 17 into the base of transistor 18 and out its emitter to the ground. The R-C time constant of the input circuitry to transistor 18 determines how long it is saturated and turned on. The values of resistor 11, capacitor 16 and resistor 17 are selected to provide the appropriate pulse duration, about 6 milliseconds, which has been found to be the optimum value for best discrimination against spurious indication from normal background radiation.

A conventional square wave audio signal generator 19 (about 2 kc. frequency) is utilized as the source for providing an audio signal to indicate the detection of a hydrogen flame. Signal generator 19 may be a simple astable multivibrator which oscillates at about 2 kc. Its output is basically a square wave. There is no need for a highly stabilized oscillator because the frequency does not signify any particular flame characteristic. A square wave audio signal, through its consistent turn on characteristics, enables an operator to more easily interpret and correlate the audio signal heard in the earphone with the environment. In the event there is a slight shift in frequency of the audio signal output from signal generator 19, it would not be evident in the head set.

The audio signal is heard in head set 20 throughout the duration of each pulse discharged from capacitor 16, as will now be explained. Transistor 18 conducts for the duration (about 6 milliseconds) of each discharge pulse from capacitor 16. During each conduction period of transistor 18, transistor 21 also conducts, which permits the audio signal from generator 9 to pass through resistor 22 and to be heard in head set 20. Upon hearing these signals, the user knows ultraviolet tube 4 has picked up the presence of ultraviolet radiation of a sufficient intensity to indicate a hydrogen flame is nearby. Resistor 22 is a potentiometer whose adjustment sets the audio level in head set 20.

The housing for the portable hydrogen flame detector of this invention is illustrated in FIG. 2. The user can carry power supply housing 31 by utilizing shoulder strap 32. Knob 33 is the ON-OFF switch for the power supply. Hand gun 30 houses all the remaining circuitry of FIG. 1. Ultraviolet tube 4 projects beyond reflector 34. Reflector 34 is a curved metal mirror. The best surface material for reflectance was found to be aluminum, although silver and steel are suitable substitutes.

A curved metal mirror was chosen to permit ultraviolet tube 4 to "face the flame," i.e. its cathode is exposed to direct ultraviolet radiation. With this arrangement, a flame out to about six feet can be monitored directly without any mirror gain. A parabolic curvature was selected for mirror 34 as the most effective means of focusing energy from long distances.

Indicator lamps 6 and 13 are located on the back of hand gun 30 for easy viewing by the user. Also, on the back of hand gun 30 is the adjustment knob (not shown) for potentiometer 22.

Head set 20 plugs into the back of hand gun 30, as is shown in FIG. 2. Output cable 35 connects power supply 31 to the detector circuitry through hand grip 36.

The operation of the above-described embodiment will now be described. First step is to turn switch 33 to ON position and check to see if power "on" light 6 is illuminated. Then to check the detector's operation hold a lit match in front of ultraviolet tube 4. If indicator light 13 comes on and a low frequency hum is heard in head set 20, the unit is ready for detecting a hydrogen flame.

The user may then carry the portable detector unit in the manner shown in FIG. 2 through the hydrogen storage area and use hand gun 30 to scan the entire area by pointing it sideways and up and down. When hand gun 30 is pointed at a hydrogen flame front, indicator light 13 will blink on and off at same rate and head phones 20 will emit a series of tone bursts.

A portable detector built as described above is able to detect a hydrogen flame 1-inch high from a distance of 80 feet. A 1-inch propane-air flame, which emits about 80 times the energy of an $H_2$-air flame, would be detectable at a distance of 500 feet using this invention.

I claim:

1. A hydrogen flame detector and monitoring system comprising:
  (a) an ultraviolet detector tube having a response essentially limited to the solar-blind ultraviolet region of 2000 A. to 2950 A., positioned within the environment to be monitored,
  (b) direct current means for sensitizing and limiting the conduction time of the said ultraviolet tube to approximately 2.5 milliseconds,
  (c) a square wave audio signal generator having a frequency of approximately 2 kilocycles,
  (d) means, including an R-C time constant circuit, cooperating with the said ultraviolet detector tube and the said square wave generator for providing an audio pulse signal having a duration of approximately 6 milliseconds, and
  (e) means, including an earphone, cooperating with the audiosignal generator, and the said means including an R-C time constant circuit, for providing an audible indication of the presence of a hydrogen flame.

References Cited
UNITED STATES PATENTS

| | | | |
|---|---|---|---|
| 2,496,886 | 2/1950 | Molloy et al. | 340—228 X |
| 3,113,212 | 12/1963 | Weil | 250—83.6 |
| 3,277,300 | 10/1966 | Kerr et al. | 340—227X |
| 3,286,093 | 11/1966 | Gilbert | 340—228X |
| 3,342,995 | 9/1967 | Axmark | 340—228X |
| 3,369,228 | 2/1968 | Foster | 340—228 |
| 3,221,317 | 11/1965 | Ferrigno | 340—384X |
| 3,278,932 | 10/1966 | Van Duzer et al. | 340—384 |

THOMAS B. HABECKER, Primary Examiner

D. L. TRAFTON, Assistant Examiner

U.S. Cl. X.R.

250—83.6; 340—228.1, 283